(12) United States Patent
Hoppel

(10) Patent No.: US 9,603,303 B2
(45) Date of Patent: Mar. 28, 2017

(54) UNIVERSAL MOUNTING ASSEMBLY FOR A UTILITY VEHICLE AND A SYSTEM INCORPORATING THE SAME

(71) Applicant: Green Industry Innovators, L.L.C., Louisville, OH (US)

(72) Inventor: Steffon L. Hoppel, Louisville, OH (US)

(73) Assignee: Green Industry Innovators, L.L.C., Louisville, OH (US)

( * ) Notice: Subject to any disclaimer, the term of this patent is extended or adjusted under 35 U.S.C. 154(b) by 0 days.

(21) Appl. No.: 14/806,122

(22) Filed: Jul. 22, 2015

(65) Prior Publication Data

US 2016/0021823 A1    Jan. 28, 2016

Related U.S. Application Data

(60) Provisional application No. 62/028,380, filed on Jul. 24, 2014.

(51) Int. Cl.
| | |
|---|---|
| *E02F 3/76* | (2006.01) |
| *A01D 42/00* | (2006.01) |
| *A01D 67/00* | (2006.01) |
| *A01D 34/64* | (2006.01) |
| *E02F 3/36* | (2006.01) |

(Continued)

(52) U.S. Cl.
CPC ............ *A01D 42/00* (2013.01); *A01D 34/64* (2013.01); *A01D 67/005* (2013.01); *E02F 3/3677* (2013.01); *A01D 69/03* (2013.01); *A01D 2101/00* (2013.01)

(58) Field of Classification Search
CPC ..... A01B 59/06; A01B 59/062; E02F 3/3677; E02F 3/3627; E02F 3/3672; E02F 3/3631; E02F 3/3686; E02F 3/3668; A01D 42/00; A01D 67/005; A01D 34/64; A01D 69/03; A01D 2101/00
USPC .... 37/466, 468; 172/272, 439; 414/697, 723
See application file for complete search history.

(56) References Cited

U.S. PATENT DOCUMENTS

| | | | | |
|---|---|---|---|---|
| 3,432,184 A | * | 3/1969 | Tweedy ............... | A01B 59/004 172/272 |
| 3,794,195 A | * | 2/1974 | Clevenger ............ | E02F 3/3631 414/723 |

(Continued)

*Primary Examiner* — Robert Pezzuto
(74) *Attorney, Agent, or Firm* — Sand & Sebolt

(57) ABSTRACT

A system and method for detachably securing an attachment to a zero-turn utility vehicle such as a zero-turn, stand-on mower. The system includes a mounting assembly provided on a hydraulically operated support member on the utility vehicle's frame; and a connector assembly provided on the attachment. The mounting assembly includes a pivotable plate member that is inserted into the complementary shaped connector assembly. The plate member includes a locking rod at an upper end. The connector assembly has side walls and a top wall that surround the plate member when the mounting assembly is engaged with the connector assembly. The top wall overhangs and captures the locking rod between the top wall and a back wall of the attachment. A locking mechanism secures the mounting assembly and connector assembly together. Moving the attachment is accomplished by actuating the hydraulic system on the utility vehicle to move the support member.

29 Claims, 14 Drawing Sheets

(51) Int. Cl.
*A01D 69/03* (2006.01)
*A01D 101/00* (2006.01)

(56) References Cited

U.S. PATENT DOCUMENTS

| | | | | |
|---|---|---|---|---|
| 5,064,338 A * | 11/1991 | Lawrence | ............... | A01B 59/06 180/53.7 |
| 5,098,252 A * | 3/1992 | Sheesley | ............... | E02F 3/3627 172/273 |
| 5,403,144 A * | 4/1995 | Staben, Jr. | ............ | E02F 3/3677 172/272 |
| 5,562,397 A * | 10/1996 | Albright | ................. | E02F 3/364 37/468 |
| 5,743,339 A * | 4/1998 | Alexander, III | ..... | A01B 59/062 172/272 |
| 6,347,671 B1 * | 2/2002 | Stiller | .................... | A01B 71/06 172/272 |
| 6,830,112 B2 * | 12/2004 | Pierce | ................. | A01B 59/048 172/439 |
| 6,832,657 B1 * | 12/2004 | LaFlair | ................ | A01B 59/064 172/21 |
| 8,752,855 B2 * | 6/2014 | Dilworth | .............. | A01B 59/064 280/481 |

* cited by examiner

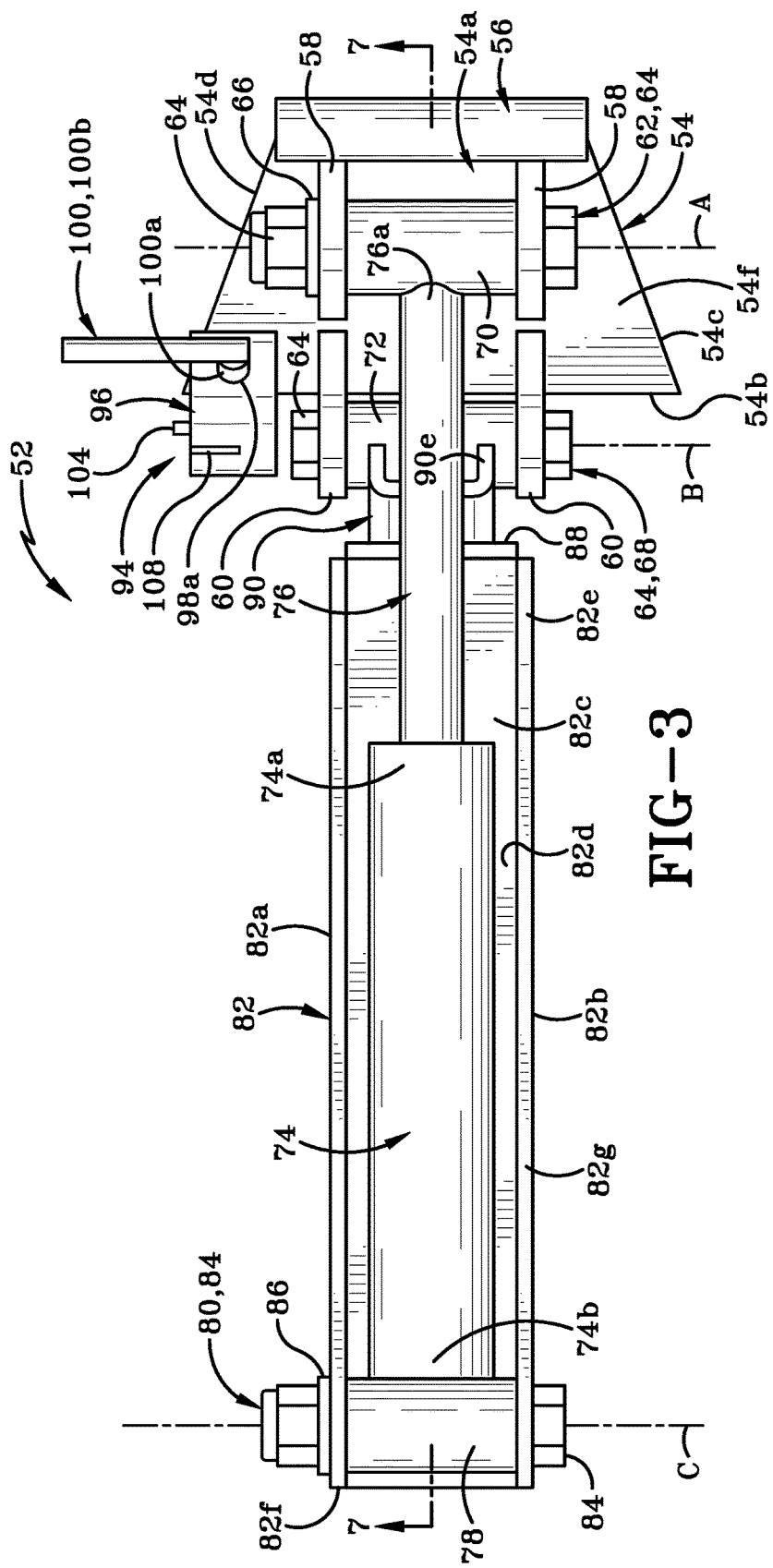

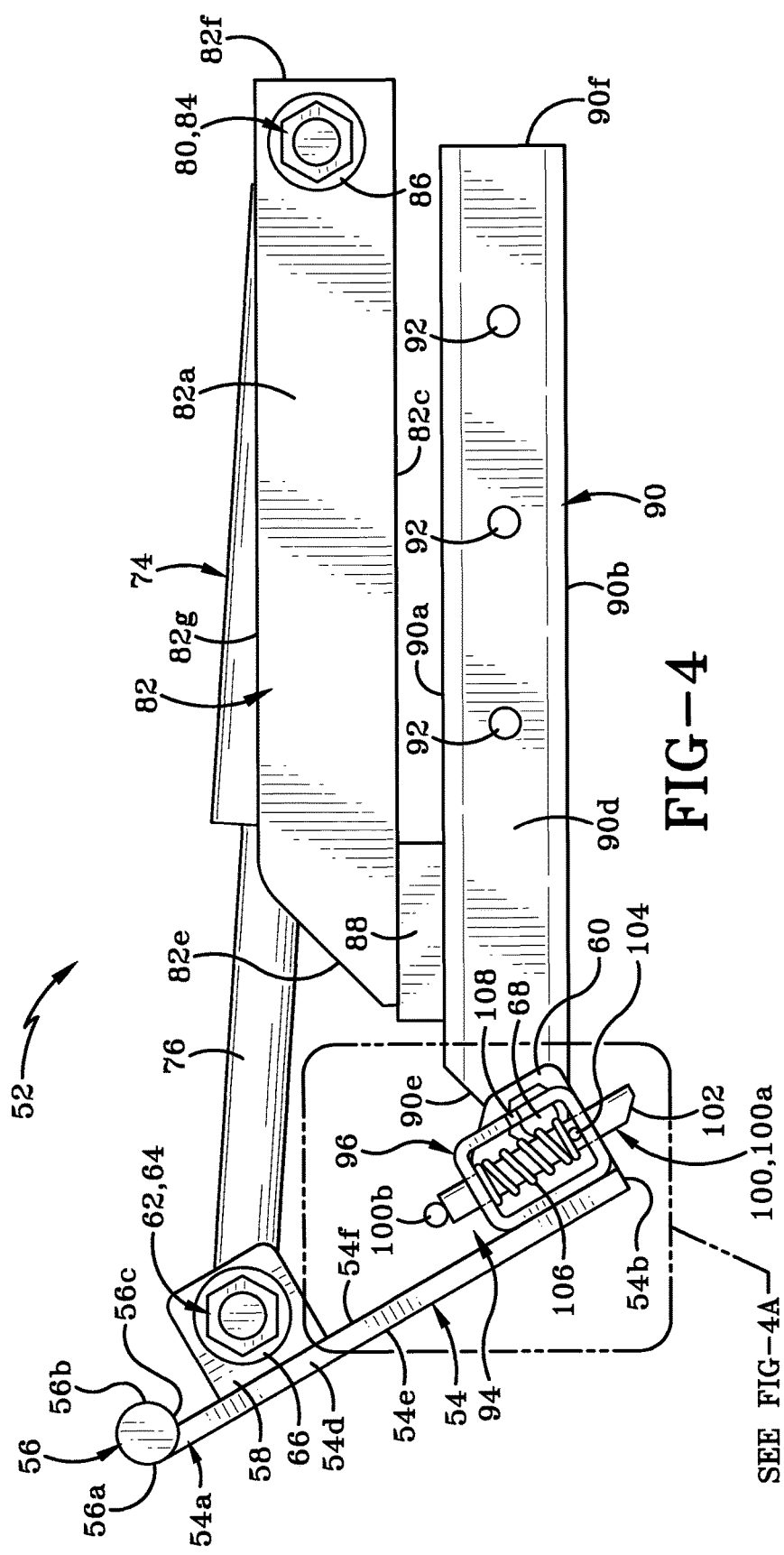

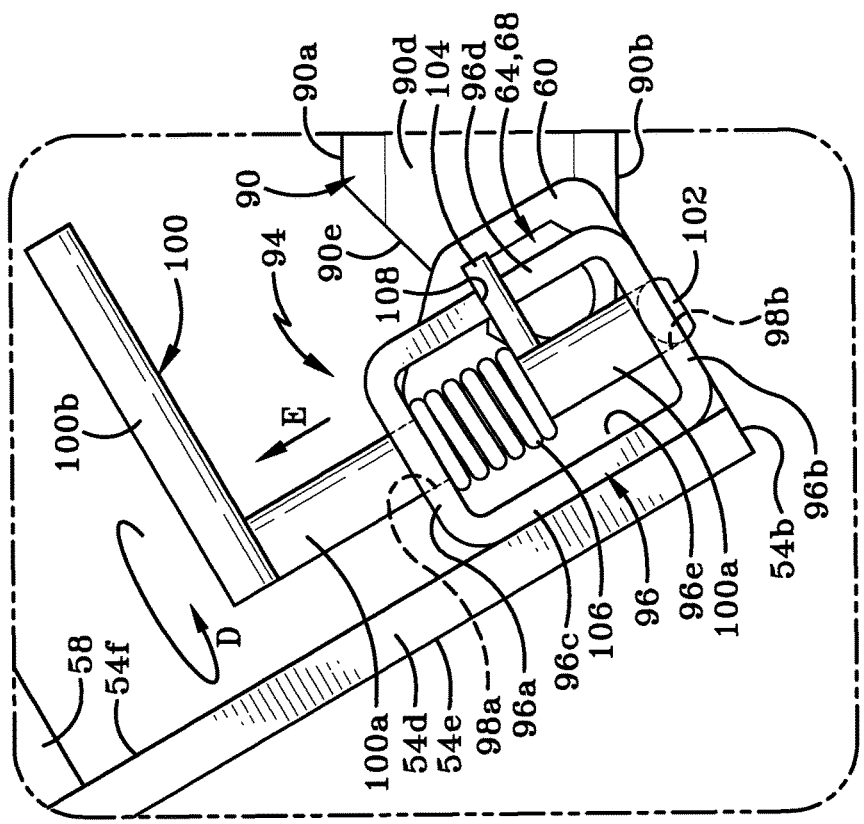
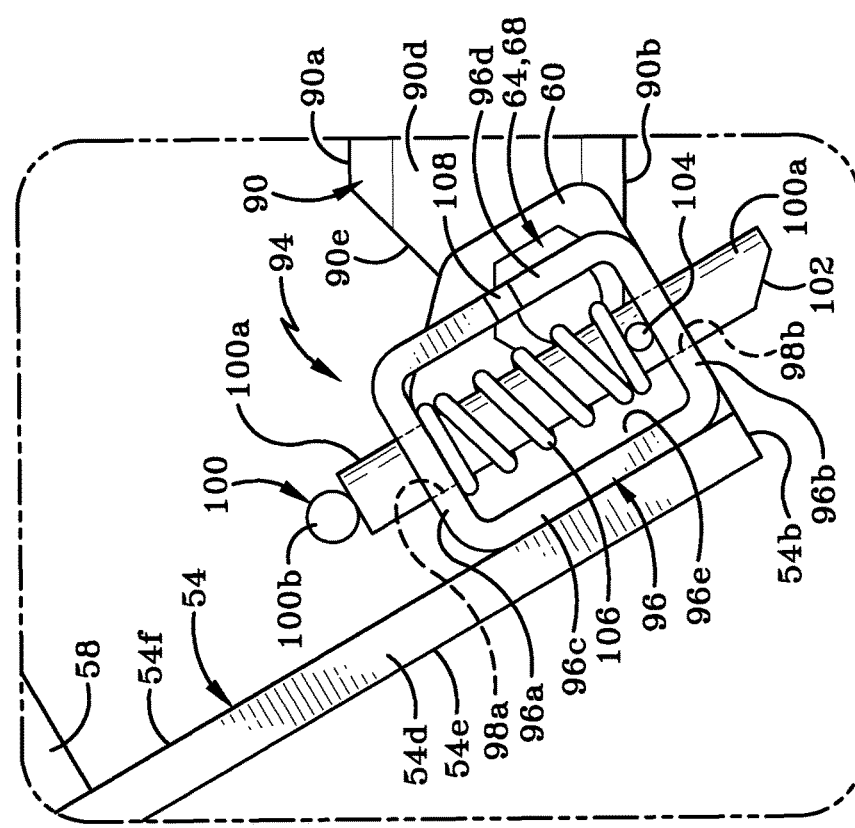

UNIVERSAL MOUNTING ASSEMBLY FOR A UTILITY VEHICLE AND A SYSTEM INCORPORATING THE SAME

CROSS-REFERENCE TO RELATED APPLICATIONS

This application claims the benefit of U.S. Provisional Patent Application Ser. No. 62/028,380 filed Jul. 24, 2014.

BACKGROUND OF THE INVENTION

Technical Field

This invention relates generally to powered utility vehicles. More particularly, this invention relates to a way of securing an attachment to a utility vehicle. Specifically, this invention is directed to a universal mounting assembly for securing a variety of different attachments to a zero-turn utility vehicle such as a mower, particularly a zero-turn stand-on mower; and most particularly for securing these different attachments in a location in front of the operator.

Background Information

Landscapers and other contractors may utilize utility vehicles that allow one or more attachments to be engaged with a front end, a rear end, or a side of the vehicle. Such attachments are useful for performing landscaping tasks and may include but are not limited to forklift assemblies, hoppers, mower assemblies, mulching assemblies, edgers, aerators, brushes, grader blades, leaf blowers, leaf vacuums/collectors, snowplow blades or snow blowers. These attachments are all configured differently and typically require different components in order to attach them to a utility vehicle.

SUMMARY

There is therefore a need in the art for a simple attachment mechanism that will enable a wide variety of differently configured attachments to be quickly and easily secured to a utility vehicle, particularly a zero-turn utility mower. The term "utility vehicle" as used herein should be understood to denote any type of vehicle to which attachments may be engaged. These vehicles may include but are not limited to any type of mower, cart, bobcat or other driven vehicle. The term "zero-turn" as used herein should be understood to reference any type of vehicle having a frame to which wheels are mounted in such a way that the vehicle has a turning radius that approximate or is close to zero. The system disclosed herein is a zero-turn mower, particularly a zero-turn stand-on mower. It will be understood, however, that zero-turn mowers on which an operator may be seated may also utilize the elements and features disclosed herein.

A system and method for detachably securing an attachment such as a forklift assembly or hopper to a zero-turn utility vehicle such as a zero-turn, stand-on mower is disclosed. The system includes a support member actuated by a hydraulic actuator. A mounting assembly provided on the support member is selectively engaged with a connector assembly provided on the attachment. The mounting assembly includes a pivotable plate member that is received into a socket of the complementary shaped connector assembly. The plate member includes a locking rod at an upper end. The connector assembly has side walls and a top wall that surround the plate member when the mounting assembly is engaged with the connector assembly by inserting the plate member with the locking rod at the uppermost end of the plate into the space defined by the side walls, top wall, and back wall of the attachment. The top wall overhangs and engages the locking rod and thereby the plate member. A locking mechanism is provided to lock the mounting assembly and connector together when the plate member and locking rod are received in the space defined by the side wall, top wall and back wall. The locking mechanism includes a locking pin on the mounting assembly that is releasably received into an aperture on the attachment. The actuator causes the support member and thereby the attachment, to be raised and lowered relative to a front end of the frame. The front end of the frame referenced herein is that part of the frame that is located in front of the operator when the vehicle is moving forward. A second hydraulic cylinder and piston are used to pivot the attachment about an axis oriented at right angles to the longitudinal axis of the vehicle.

In one aspect, the invention may provide a system comprising a utility vehicle having a frame upon which a plurality of wheels is mounted in such a way that the vehicle has a turn radius that approximates zero; a support member extending forwardly beyond a front end of the frame and terminating in an outermost end; a mounting assembly provided proximate the outermost end of the support member; an actuator engaged with the support member and being operable to move the support member relative to the front end of the frame; one or more attachments to be selectively engaged with the vehicle; and a connector assembly provided on each attachment; wherein a selected one of the one or more attachments is engaged with the utility vehicle by engaging the connector assembly on the selected attachment with the mounting assembly.

In another aspect, the invention may provide a zero-turn utility vehicle that is a zero-turn mower that includes a platform mounted on the frame and is adapted to permit an operator to stand thereon. Still further, in another aspect the invention may provide a zero-turn utility vehicle that alternatively or additionally includes a seat mounted on the frame and which is adapted to permit an operator to sit thereon.

In yet another aspect, the invention may provide a method of securing an attachment to a utility vehicle comprising providing a utility vehicle having a frame upon which a plurality of wheels are mounted in such a way that the vehicle has a turn radius that approximate zero; engaging a support member to a hydraulically operable actuator provided on the utility vehicle and the support member extends towards a front end of the frame; selecting one of a plurality of attachments for engagement with the utility vehicle; engaging a mounting assembly on an outermost end of the support member to a connector assembly provided on the selected one of the plurality of attachments. The hydraulically-operable actuator selectively raises or lowers the outermost end of the support member relative to the front end of the frame and thereby raises or lowers the selected one of the plurality of attachments engaged with the support member.

In a further aspect, the invention may provide a universal mounting system for securing an attachment to a utility vehicle; said mounting system comprising a support member adapted to extend outwardly beyond a section of the utility vehicle's frame, said support member terminating in an outermost end; a mounting assembly provided proximate the outermost end of the support member; a connector assembly adapted to be secured to an attachment; wherein the mounting assembly is complementary to the connector assembly and is receivable therein.

Still further, the invention may provide a mounting system in which the mounting assembly includes a plate having a top end; a locking rod provided at the top end of the plate; and wherein the mounting assembly includes a pair of side walls adapted extend outwardly from a back wall of the attachment; said side walls being spaced apart from each other to a degree sufficient to receive the plate therebetween; and a top wall that extends between the side walls and projects for a distance outwardly from the back wall and downwardly beyond a top end of each side wall; and a gap is defined between the top wall and the back wall of the attachment; and wherein the locking rod is captured in the gap when the plate is engaged between the side walls. The plate has to be angled relative to the back wall in order to slide the locking rod into the gap.

BRIEF DESCRIPTION OF THE SEVERAL VIEWS OF THE DRAWINGS

A sample embodiment of the invention is set forth in the following description, is shown in the drawings and is particularly and distinctly pointed out and set forth in the appended claims.

FIG. 3 is an enlarged top view of the mounting assembly;

FIG. 4 is an enlarged left side view of the mounting assembly;

FIG. 4A is an enlarged left side view of a locking mechanism on the mounting assembly, with the locking mechanism shown in an extended or locked position;

FIG. 4B is an enlarged left side view of the locking mechanism shown in a retracted or unlocked position;

DETAILED DESCRIPTION

Figure 1:
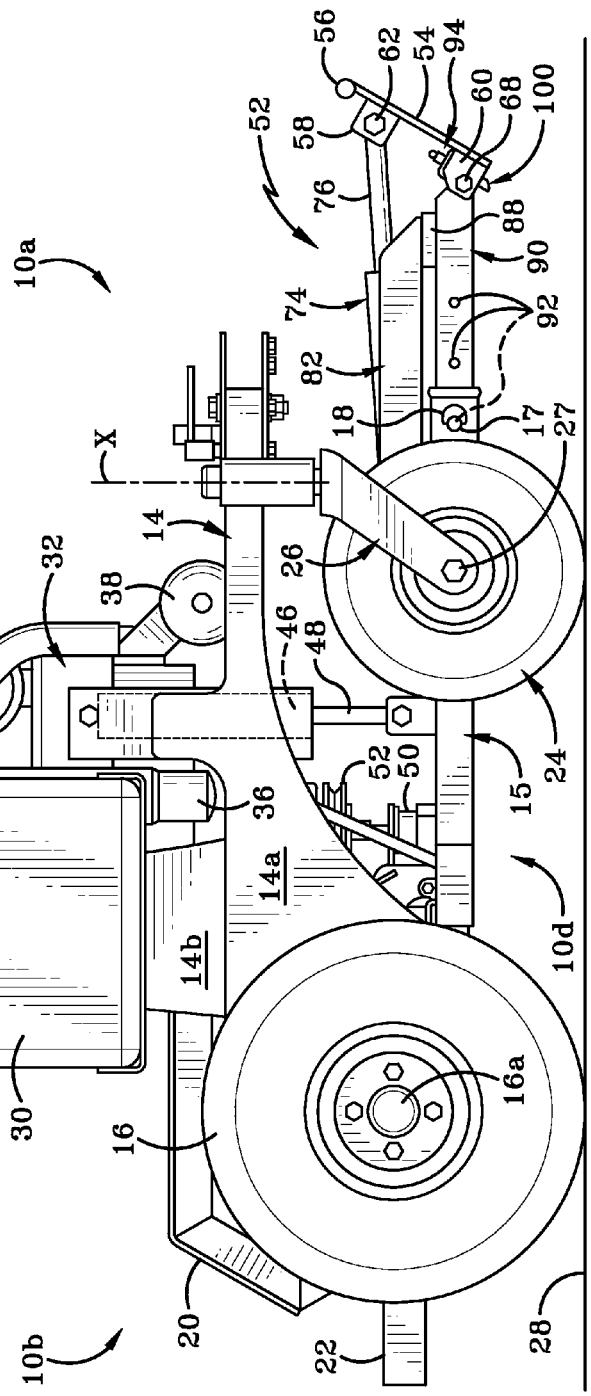
FIG. 1 is a right side view of a utility vehicle showing a universal mounting assembly provided at a front end thereof.

Referring to FIG. 1 there is shown a utility vehicle in accordance with an aspect of the present invention, generally indicated at 10. The utility vehicle illustrated herein is a zero-turn, stand-on vehicle, i.e., the operator stands on a platform instead of sitting on a seat. More specifically, the vehicle is a zero-turn, stand-on mower. It will be understood, however, that a wide range of different utility vehicles other than stand-on mowers could be used in conjunction with the universal mounting assembly disclosed herein, including but not limited to ride-on mowers, push mowers, trucks, snowplows etc. The universal mounting assembly may be utilized in conjunction with a complementary connector assembly provided on a variety of different attachments. Together, the mounting assembly and complementary connector assembly form a universal mounting system.

Utility vehicle 10 has a front end 10a, a rear end 10b, a top 10c, and a bottom 10d. The front end of the vehicle is that part of the utility vehicle which will be in front of the operator when the vehicle is moving forward and the rear end of the vehicle is that part of the vehicle that will be behind the operator when the vehicle is reversing or moving backward. The front end 10a and rear end 10b define a longitudinal direction between them. The top 10c and the bottom 10d define a vertical direction between them. The vehicle 10 also has a right side and left side that define a horizontal or lateral direction between them.

Referring still to FIG. 1, utility vehicle 10 includes a rigid frame 14, typically fabricated from metal and extending from front end 10a to rear end 10b and from the right side to the left side of vehicle 10. Frame 14 includes, amongst other components, right and left side members 14a, front and rear members (not shown), and upstanding members 14b that extend outwardly and upwardly from right and left side members 14a. Right and left side members 14a extend longitudinally from proximate front end 10a to proximate rear end 10b. The front and rear members extend horizontally/laterally between the right and left side members 14a. It will be understood that frame 14 may include other cross-braces and members.

A support member 15 is pivotally secured to a portion of frame 14 by a pivot 13 (FIG. 10) and extends longitudinally forwardly toward front end 10a and beyond the front member. Any components that are to be secured to front end 10a of vehicle 10 may be detachably engaged with support member 15 at an engagement point (the location of a locking member 17 in FIG. 1, for instance), as will be further described herein.

Utility vehicle 10 is provided with wheels that are mounted on the frame in such a way that the vehicle's turning radius is close to zero. Vehicle 10 has powered (or driven) right and left rear wheels 16 that are each operatively mounted on frame 14 via an axle 16a. Axle 16a may be a single axle that extends between right and left rear wheels 16 or each wheel may have its own axle. Rear wheels 16 rotate about an axis that extends through axle 16. A mud-flap 20 may be positioned adjacent a top surface and interior side surface of each of the right and left rear wheels 16 to prevent mud and water from splashing upwardly toward an operator standing on a platform 22 at rear end 10b. Platform 22 may include a suspension system to make the stand-on ride for an operator more comfortable. Mud-flaps 20 and platform 22 are all operatively engaged with frame 14. It will be understood that a seat may alternatively or additionally be provided on utility vehicle 10 instead of platform 22 and this seat would also be operatively engaged with frame 14.

Non-powered right and left front wheels 24 are mounted on frame 14 proximate front end 10a of utility vehicle 10. Each of the front wheels 24 is operatively engaged with frame 14 via a mounting assembly 26. Each mounting assembly 26 is secured to the associated left or right front wheel 24 via a bolt 27 and may secured to frame 14 in such a way that front wheels 24 are able to selectively pivot through 360 degrees about an axis "X". In other words, front wheels 24 may be a type of caster. Mounting assemblies 26 may further include a locking member that may fix front wheels 24 in a particular orientation relative to frame 14 and so that wheels 24 are prevented from rotating about axis "X", if this is desired.

Rear wheels 16 and front wheels 24 are positioned to engage a ground surface 28 and roll over that ground surface 28 to move the utility vehicle 10 in a forward or rearward direction as well as to the left or right. Preferably, utility vehicle 10 is a zero-turning radius machine but it will be understood that utility vehicle 10 may be differently configured to enable it to give it a wider turning range.

Various other components of utility vehicle 10 are operatively engaged with or mounted on frame 14. These include a gas tank 30, an engine 32, an oil tank 34 with an oil filter 36 for the engine 32, an air filter 37, and a muffler 38 to dampen noise. A control panel 40 may also be mounted on upstanding members 14b of frame 14 and be used to control various functions. One or more hand-operable levers 42 are operatively engaged with rear wheels 16. Only one of these levers 42 is illustrated in FIG. 1, namely the lever that controls the right rear wheel 16. It will be understood that a similar lever is provided for controlling the left rear wheel. A console including a joystick 44 is also provided on utility vehicle 10. Joystick 44 may be used to operate a hydraulic system (including cylinder 46 and piston 48) that may control the operation of an attachment 114 (FIG. 10) engaged with utility vehicle 10. Alternatively, a control 138 provided on control panel 40 may be used to operate an attachment engaged with utility vehicle 10.

Much of the hydraulic system provided on utility vehicle 10 is not illustrated herein. Components of the hydraulic system that are illustrated in FIG. 1 are the hydraulic cylinder 46 with piston 48, and a hydraulic pump 50. It will be understood that the system will also include a reservoir and tubing to connect the various components. The hydraulic system includes a hydraulically-operable actuator that is used to vertically raise or lower support member 15 relative to the frame 14, particularly relative to the front end of the frame 14. Cylinder 46 and piston 48 are operatively engaged with a region of support member 15 and are selectively activated to raise or to lower support member 15 relative to the front end of frame 14 as will later be described herein.

It will be understood that instead of a hydraulic operating system, vehicle 10 may instead be provided with a pneumatic or electrical operating system or systems utilizing combinations of all three types of operating system.

The universal mounting assembly used in the system is shown in FIG. 1. A portion of the universal mounting assembly is shown inserted into a bore defined in a front end 15a of support member 15 and a remaining portion of the mounting assembly 52 extends outwardly and forwardly from that front end 15a. Mounting assembly 52 is identified in the figures by reference number 52. Mounting assembly 52 may be fabricated from steel or some other suitable metal or composite material that has strength and rigidity.

Figure 5:
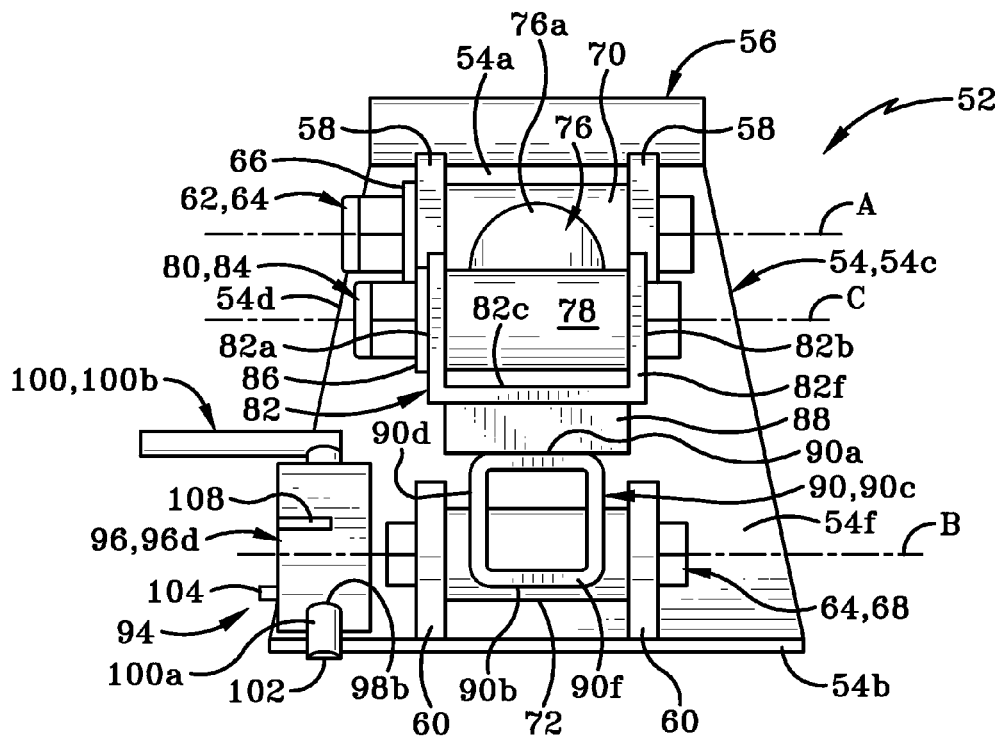
FIG. 5 is an enlarged rear view of the mounting assembly.
Figure 6:
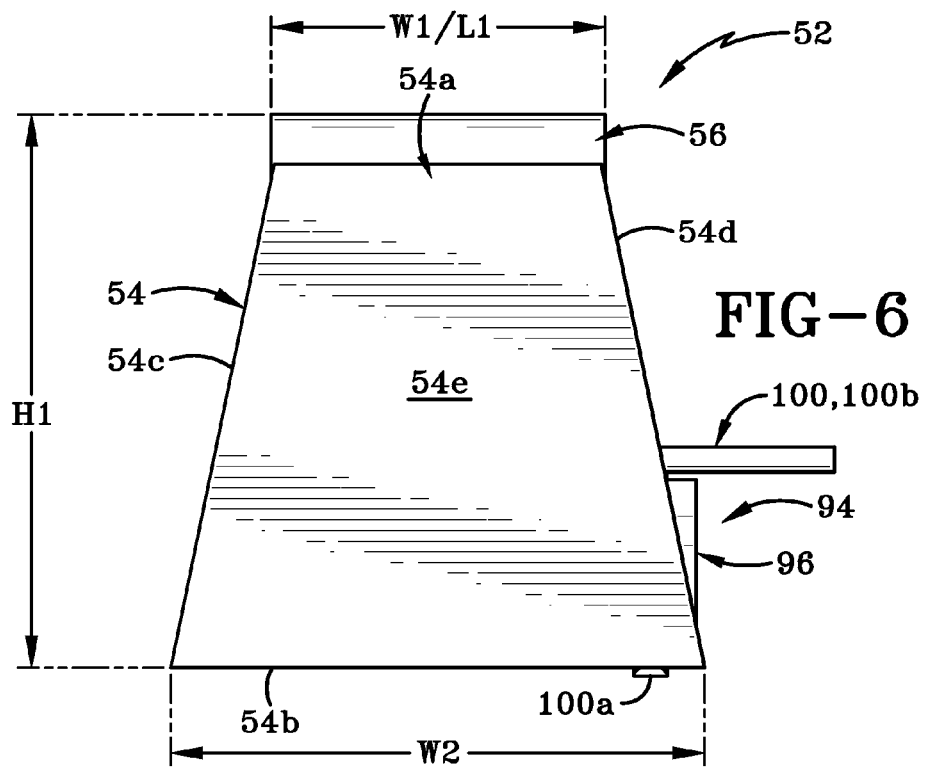
FIG. 6 is an enlarged front view of the mounting assembly.

Mounting assembly 52 is shown in greater detail in FIGS. 2-7. Assembly 52 includes a plate member 54 and an assembly frame comprised of several members that will be further described hereafter. Plate member 54 is of a first configuration and is design to engage a complementary socket on a connector assembly. The socket is of a configuration complementary to the first configuration of plate member 54. Plate member 54 may be a generally planar member (FIG. 2) having a truncated-triangular shape (FIG. 6). FIGS. 3, 5 and 6 show plate member 54 having a top end 54a, a bottom end 54b, a first side 54c, a second side 54d (FIG. 3), a front surface 54e, and a back surface 54f. Top end 54a of plate member 54 is of a width "W1" (FIG. 6) and bottom end 54b of plate member 54 is of a width "W2", where "W2" is greater than "W1". Thus, plate member 54 tapers from bottom to top. Plate member 54 therefore has a truncated triangular shape when viewed from the front such as in FIG. 6. Plate member 54 is also of a height "H1" (FIG. 6) measured from top end 54a to bottom end 54b. Plate member 54 may be planar along height "H1".

Figure 2:
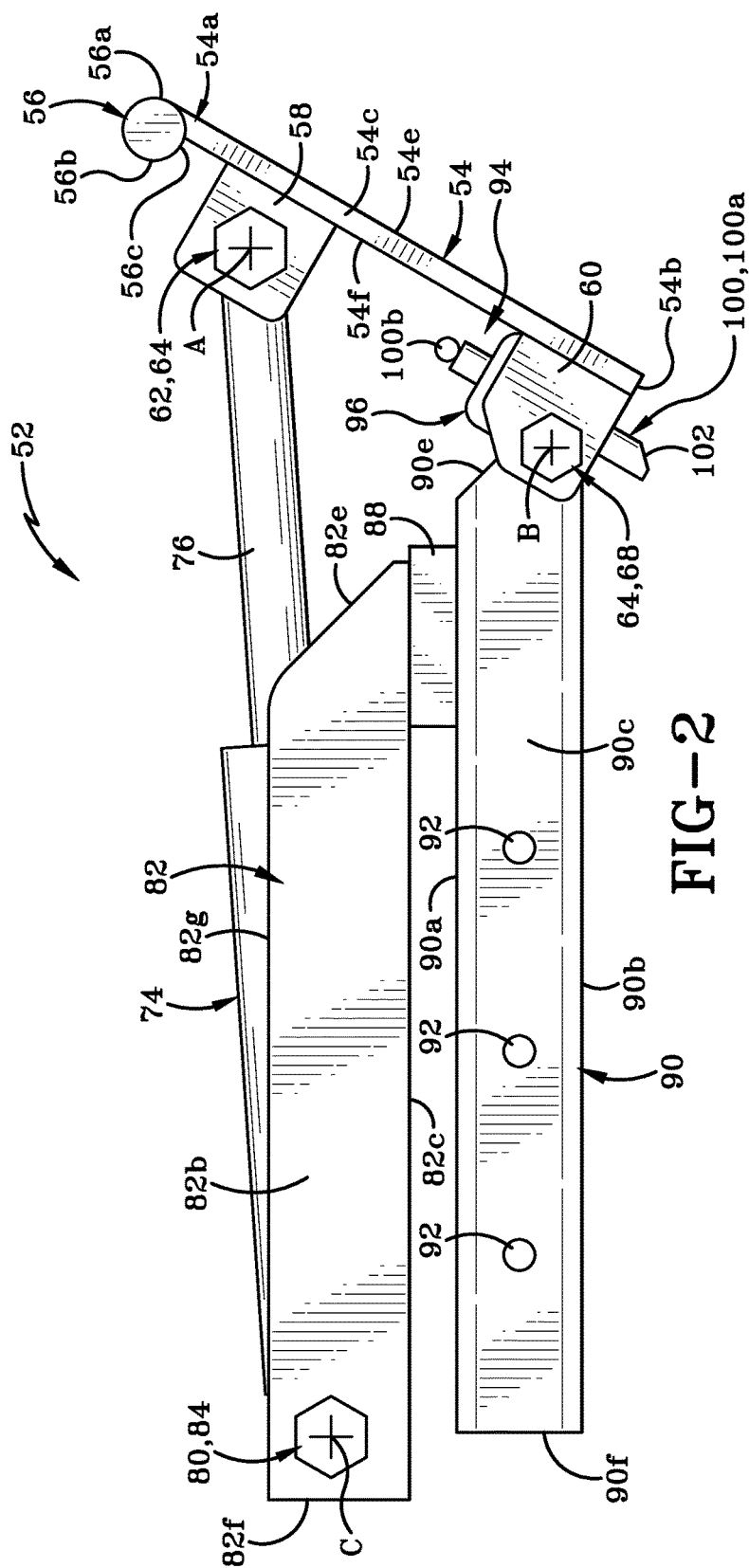
FIG. 2 is an enlarged right side view of the mounting assembly shown detached from the utility vehicle.

A locking rod 56 is welded or otherwise secured to top end 54a of plate member 54. Locking rod 56 may be generally circular in cross-section and is positioned so that a front region 56a (FIG. 2) of the circumferential exterior surface thereof is generally aligned with front surface 54e of plate member 54. (Other cross-sectional configurations may be used instead of circular, such as hexagonal or even square.) FIG. 2 shows that a rear region 56b of the circumferential exterior surface of locking rod 56 extends for a distance outwardly beyond rear surface 54f of plate member 54. There is thus a region 56c of locking rod 56 that overhangs rear surface 54f. FIGS. 5 and 6 show that locking rod 56 is of a length "L" that is substantially equal to the width "W1" of top end 54a of plate member 54, although the length "L" may be less than width "W1". Alternatively, locking rod 56 may be comprised of several shorter sections that are spaced at intervals from each other along top end 54a of plate 54.

Figure 7:
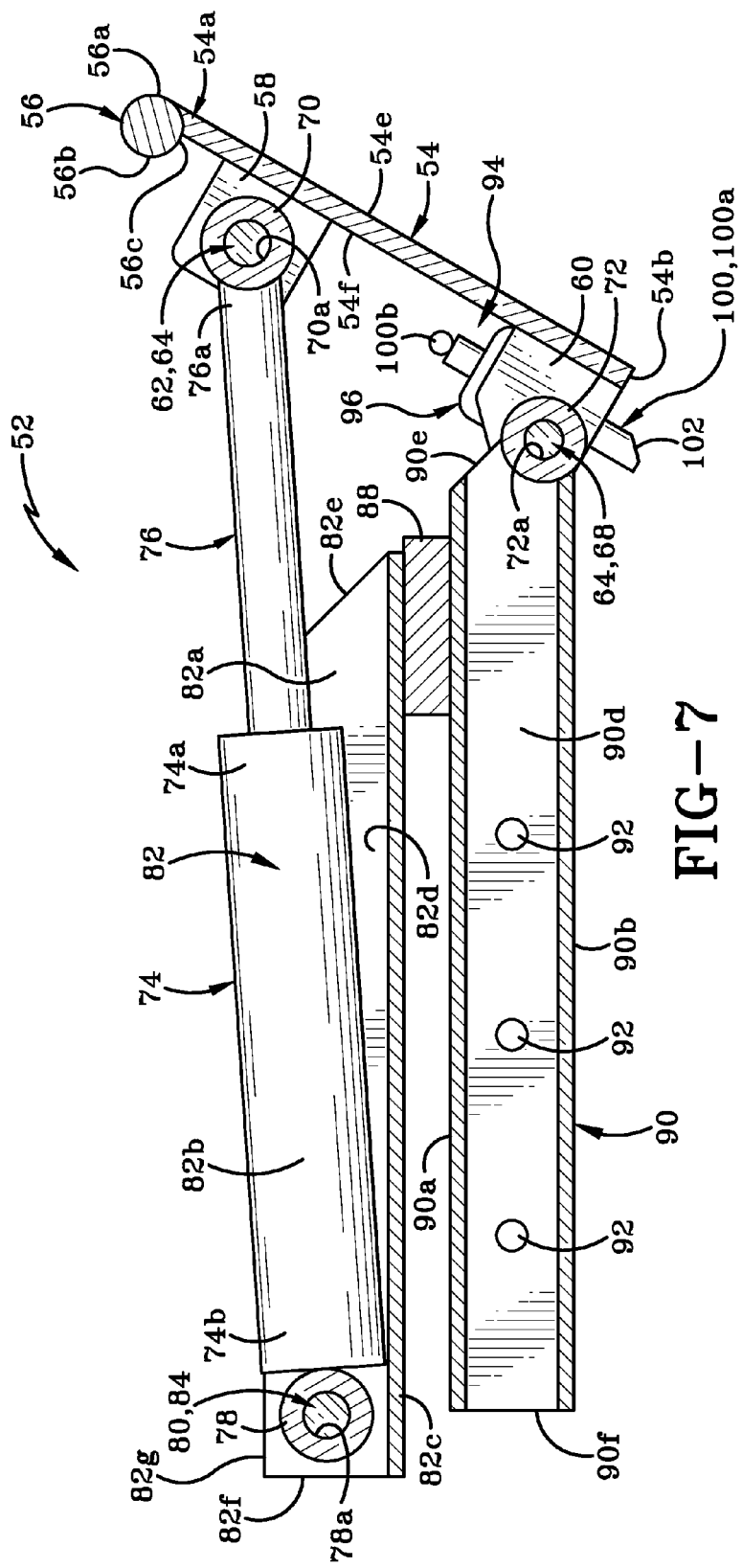
FIG. 7 is an enlarged cross-sectional view of the mounting assembly taken along line 7-7 of FIG. 3.

A pair of upper mounting brackets 58 may be welded to back surface 54f of plate member 54. Brackets 58 may be located a distance downwardly from top end 54a and the two brackets 58 may be spaced a distance laterally apart from each other. Each bracket 58 is oriented substantially at right angles to back surface 54f and extends outwardly therefrom. A pair of lower mounting brackets 60 may be welded to back surface 54f of plate member 54 a distance vertically below upper mounting brackets 58 and a bottom region of each lower mounting bracket 60 may be substantially aligned with bottom end 54b of plate member 54. A first pivot 62 may be secured between upper mounting brackets 58 by appropriate fasteners 64 and washers 66. A second pivot 68 may be secured between lower mounting brackets 60 by appropriate fasteners. Referring to FIG. 7, a first sleeve 70 may be provided that defines a bore 70a therethrough. Additionally, a second sleeve 72 may be provided that defines a bore 72a therethrough. First pivot 62 may extend through bore 70a of first sleeve 70 and second pivot 68 may extend through bore 72a of second sleeve 72. First sleeve 70 may be free to rotate about an axis "A" (FIG. 3) extending along first pivot 62. Second sleeve 72 may be free to rotate about an axis "B" extending along second pivot 68.

The assembly frame of mounting assembly 52 may further include a cylinder 74 and associated piston 76; an upper beam 82, a lower beam 90, and a mounting block 88. Cylinder 74 may be hydraulic or pneumatic in operation. Cylinder 74 has a first end 74a and a second end 74b. A piston 76 extends outwardly from first end 74a and first sleeve 70 may be fixedly connected, such as by welding, to an end 76a (FIG. 3) of piston 76. First sleeve 70 may be oriented at right angles to piston 76 and the components together may form a T-shaped connection. Piston 76 is movable between an extended position and a retracted position relative to first end 74a of cylinder 74. As piston 76 moves between the extended and retracted positions, first sleeve 70 is rotated in a first or second direction, respectively, around axis "A", as will be further described herein.

A third sleeve 78 may be fixedly secured, such as by welding, to second end 74b of cylinder 74. Third sleeve 78 defines a bore 78a therein. Mounting assembly 52 may further include a U-shaped upper beam 82 having a first side wall 82a, a second side wall 82b, and a bottom wall 82c. First and second side walls 82a, 82b and bottom wall 82c bound and define a space 82d that may extend from a first end 82e of upper beam 82 to a second end 82f thereof. Aligned holes may be defined in each of the first and second side walls 82a, 82b of upper beam 82, proximate second end 82f. A third pivot 80 may pass through bore 78a of third sleeve 78 and this third pivot 80 may extend through the aligned holes in first and second side walls 82a, 82. Third pivot 80 thus may engage third sleeve 78 and thereby cylinder 74 to upper beam 82. Appropriate fasteners 84 and washers 86 secure third pivot 80 to beam 82. Third sleeve 78 may be able to freely pivot about an axis "C" (FIG. 3) that extends along third pivot 80. As shown in FIGS. 2-4, cylinder 74 may be positioned substantially within the space 82d defined by U-shaped upper beam 82. Side walls 82a, 82b and bottom wall 82c (FIG. 3) of upper beam 82 may protect cylinder 74 from possible side and bottom impacts during use of vehicle 10.

Mounting assembly 52 may further include a mounting block 88 and a lower beam 90. Lower beam 90 may be of any desired cross-section such as the square cross-section illustrated in FIG. 5. This figure shows that lower beam 90 may be a hollow beam that has an upper wall 90a, a lower wall 90b, a first side wall 90c, and a second side wall 90d. Lower beam 90 also a front end 90e (FIG. 2) and a rear end 90c. Lower beam 90 may be positioned vertically beneath upper beam 82 but the front ends 82e and 90e may not be vertically aligned with each other. Instead, front end 90e may be positioned a distance outwardly beyond first end 82e. Similarly, rear ends 82f and 90f are not vertically aligned. Instead, rear end 82f projects for a distance outwardly beyond rear end 90f. Front ends 82f and 90f may both be similarly angled as illustrated in FIG. 2. FIG. 2 shows that front ends 82f and 90f may slope rearwardly in that the bottom walls 82b and 90b may extend out further away from the respective rear walls 82f, 90f than do the top surfaces 82g or top wall 90a. The angled front ends 82e, 90e enable plate member 54 to be pivoted rearwardly past vertical during operation, as will be later described herein. The upper region of front end 82e that connects to top surfaces 82g may be curved as illustrated in the figures.

Mounting block 88 may be fixedly secured, such as by welding, to an exterior surface of bottom wall 82c of upper beam 82. Mounting block 88 may be further secured to an exterior surface of upper wall 90a of lower beam 90. Mounting block 88 thus secures upper and lower beams 82, 90 together in a fixed orientation relative to each other. Mounting block 88 may be positioned generally vertically beneath the angled front end 82e of upper beam 82 and a short distance rearwardly of the angled front end 90e of lower beam 90. Mounting block 88 may be positioned on top wall 90a a distance rearwardly of angled front end 90e. As indicated above, front end 90e of lower beam 90 may be disposed a distance longitudinally forward of front end 82e of upper beam 82. This difference in the positioning of front ends 82e and 90e also enables the rearward pivoting of plate member 54, as will be further described.

As best seen in FIG. 3, front end 90e of lower beam 90 is secured, such as by welding, to sleeve 72. Sleeve 72 is able to pivot about axis "B" extending along second pivot 68 in response to motion in lower beam 90. Sleeve 72 is secured to lower beam 90 closer to bottom wall 90b thereof than to top wall 90a.

A plurality of pairs of aligned through-holes 92 may be defined in opposed side walls 90c, 90d of lower beam 90. The holes 92 are spaced longitudinally from each other along the length of lower beam 90 (where the length is measured from front end 90e to rear end 90f). Lower beam 90 of mounting assembly 52 is secured to a front end of support member 15 by way of a suitable securement. One such suitable securement may be a locking pin 17 that is passed through a pair of opposed holes (not shown) defined in support member 15, which opposed holes may be aligned with one of the pairs of opposed holes 92 in lower beam 90. Locking pin 17 may then be secured against being removed from the holes by a clevis pin 18 or ring. Since lower beam 90 is secured to support member 15, any movements in support member 15 caused by the utility vehicle's hydraulic system being activated will be imparted to lower beam 90 and thereby to a remaining portion of mounting assembly 52.

Mounting assembly 52 may further include a locking assembly 94. Locking assembly 94 is shown in greater detail in FIGS. 4A and 4B. A mounting bracket 96 may be secured, as by welding for example, to back surface 54f of plate member 54. FIGS. 3 and 5 show that mounting bracket 96 is laterally spaced from one of lower mounting brackets 60 and proximate to but inwardly of side 54d of plate member 54. Mounting bracket 96 may be of a rectangular cross-sectional shape and include a top wall 96a, a bottom wall 96b, a front wall 96c, and a rear wall 96d. A central bore 96e may be bounded and defined by top, bottom, front, and rear walls 96a-96d. A pair of aligned apertures 98a, 98b may be defined in opposed top and bottom walls 96a, 96b. An L-shaped pin 100 may be provided for engagement in bracket 96. Pin 100 includes a first leg 100a and a second leg 100b that are disposed at right angles to each other. First leg 100a of pin 100 extends through aperture 98a in top wall 96a and a free end of first leg 100a at least partially extends through aperture 98b. Second leg 100b of pin 100 may be positioned vertically above top wall 96a of mounting bracket 96. The free end of first leg 100a includes an angled face 102. The purpose of angled face 102 will become evident later in this description. An arm 104 extends horizontally outwardly from a side wall of first leg 100a a distance upwardly away from the free end and angled face 102. Arm 104 may be disposed at right angles to the side wall of first leg 100a.

A coil spring 106 may be positioned around the exterior surface of the side wall of first leg 100a of pin 100. Spring 106 is positioned between an interior surface of top wall 96a and an upper surface of arm 104. Rear wall 96d of mounting bracket 96 defines a slot 108 therein that may be sized and oriented to receive arm 104 therein when pin 100 is in a particular orientation within mounting bracket 96.

FIG. 4A shows the locking assembly 94 in a locked position. When locking assembly 94 is in the locked position, second leg 100b of pin 100 may be located substantially parallel to back surface 54a of plate member 54. In this orientation arm 104 may not be received in slot 108, coil spring 106 is in an uncompressed or expanded condition and consequently arm 104 is forced downwardly and into abutting contact with an interior surface of bottom wall 96b of mounting bracket 96. In this locked position, the angled face 102 of pin 100 may be positioned a distance below the exterior surface of bottom wall 96b of mounting bracket 96.

FIG. 4B shows the locking assembly 94 in an unlocked position. Locking assembly 94 may be moved into this unlocked position by rotating pin 100 about an axis extending through first leg 100a of pin 100. This may be accomplished by grasping second leg 100b of pin and using it as a handle to rotate pin in a first direction indicated by arrow "D". The rotational motion moves second arm 100b from an orientation where the arm may be parallel to back surface 54f of plate member 54 to an orientation where the arm 100b may be generally at right angles relative to back surface 54f and extend outwardly and rearwardly away therefrom. When arm 100 is rotated, the user will also simultaneously pull arm 100 upwardly in the direction indicated by arrow "E". This upwardly motion "E" compresses coil spring 106 as illustrated in FIG. 4B. As pin 100 moves upwardly and rotates, arm 104 reaches slot 108 and will slide into slot 108, thereby locking pin 100 in a fixed position relative to bracket 96. When pin 100 is in this fixed position, angled face 102 extends only slightly below exterior surface of bottom wall 96b of bracket 96 and locking mechanism 94 is in the unlocked position. Free end of pin 100 remains seated in hole 98b when locking mechanism 94 is in the unlocked position. This ensures that pin 100 will remain correctly aligned within bracket 96 so as to be able move easily between locked and unlocked positions. When it desired to move locking assembly 94 from the unlocked position (FIG. 4B) back to the locked position (FIG. 4A), second leg 100b of arm 100 is grasped and is rotated in the opposite direction to arrow "D" (FIG. 4B). As this occurs, arm 104 slides along slot 108. As soon as arm 104 exits slot 108, spring 106 returns to its uncompressed length and shape, driving pin 100 downwardly in the direction opposite to arrow "E" until arm 104 contacts bottom wall 96b of bracket 96.

Figure 14:
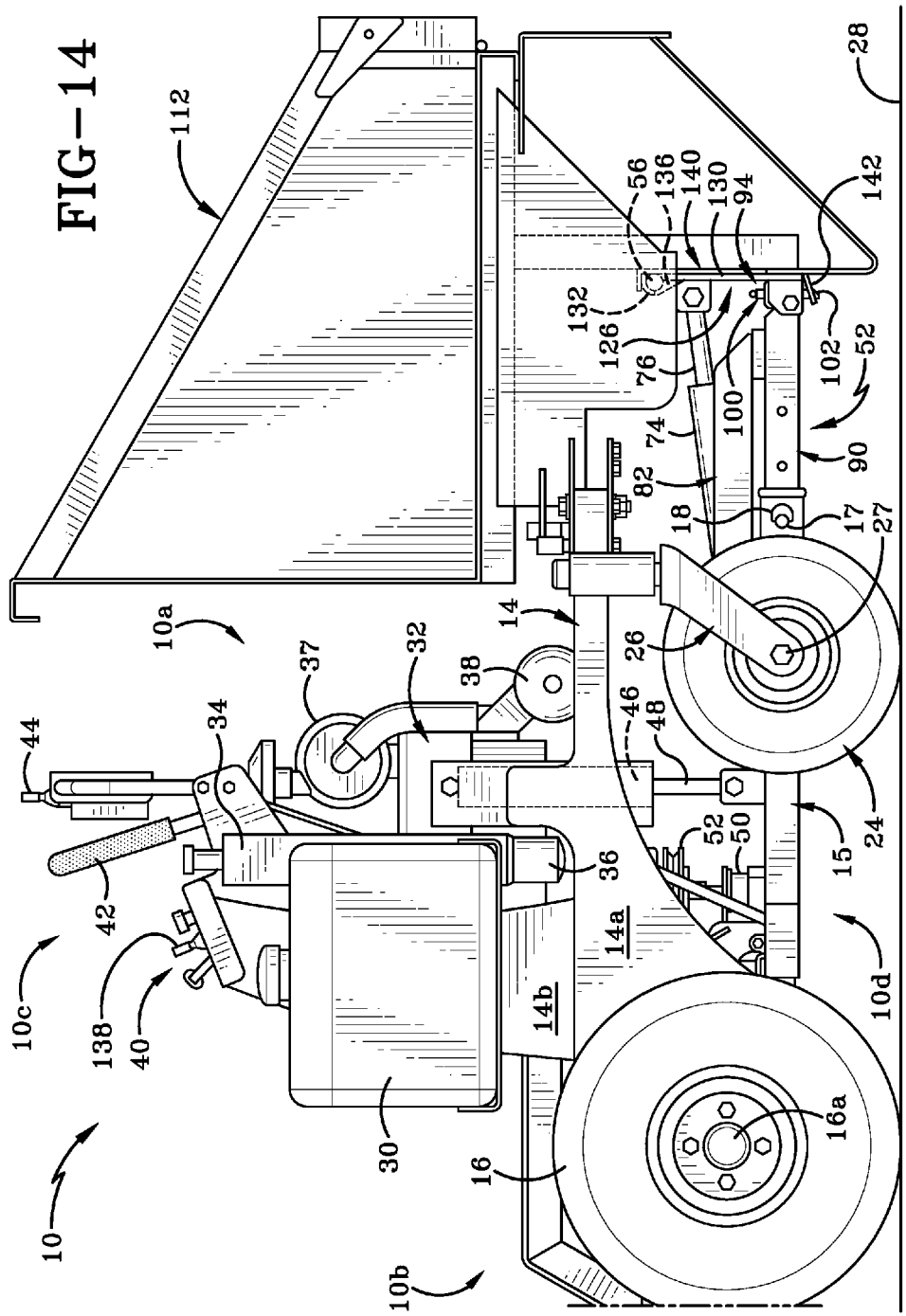
FIG. 14 is a right side view of the utility vehicle with a second attachment engaged with the utility vehicle via the mounting assembly Similar numbers refer to similar parts throughout the drawings.

Utility vehicle 10 may be used for a wide variety of purposes by selectively attaching thereto, by way of mounting assembly 52, any one of a number of different attachments. The possible attachments include but are not limited to a forklift assembly 110 (FIG. 10), a hopper 112 (FIG. 14), aerator, brush, blade, edger, brush cutter, roller assembly, leaf blower, leaf collector, snowplow blade, a snow blower etc.

Figure 8:
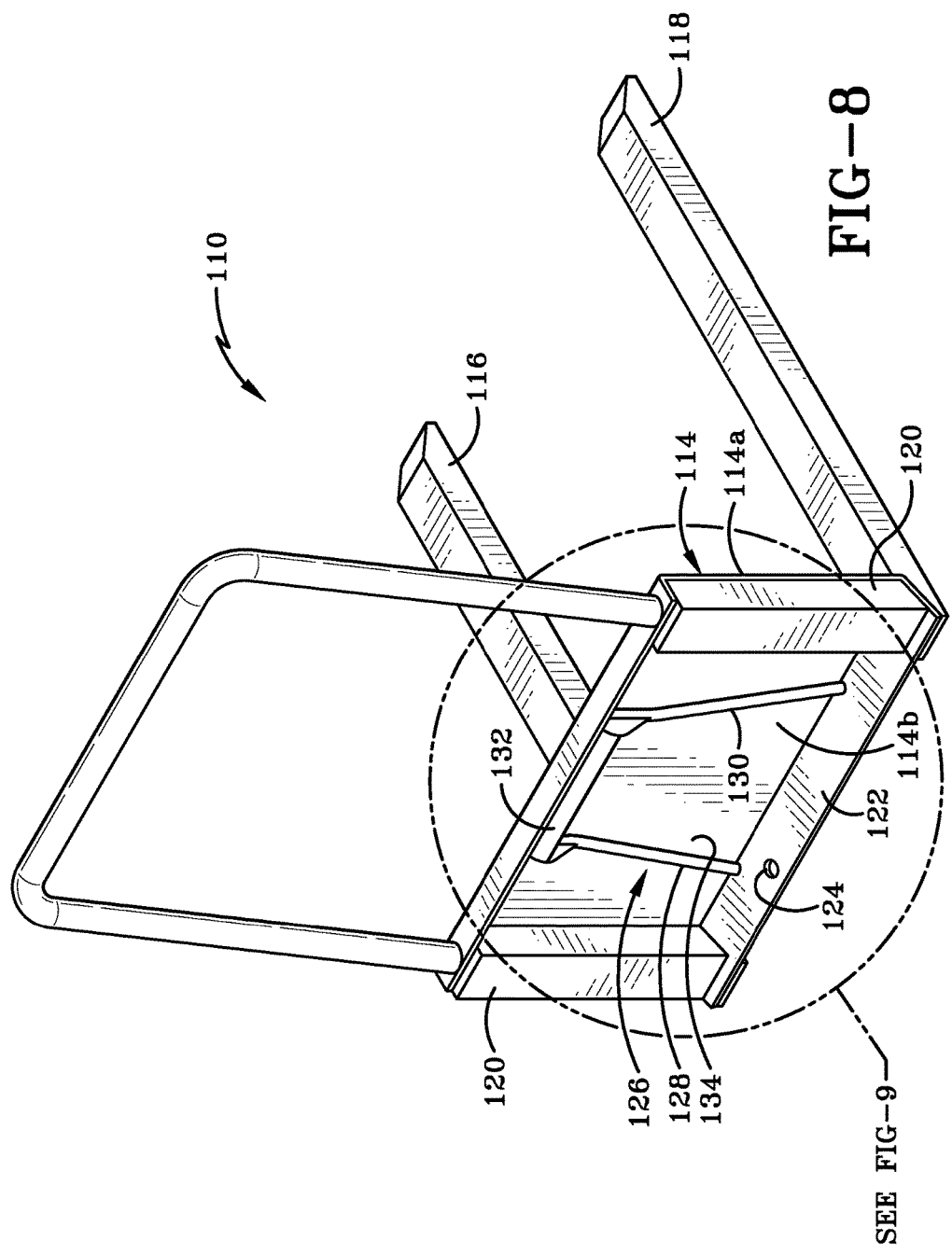
FIG. 8 is a perspective rear view of a first attachment configured for engagement with the mounting assembly and showing a connector assembly provided on a back wall of the first attachment.
Figure 9:
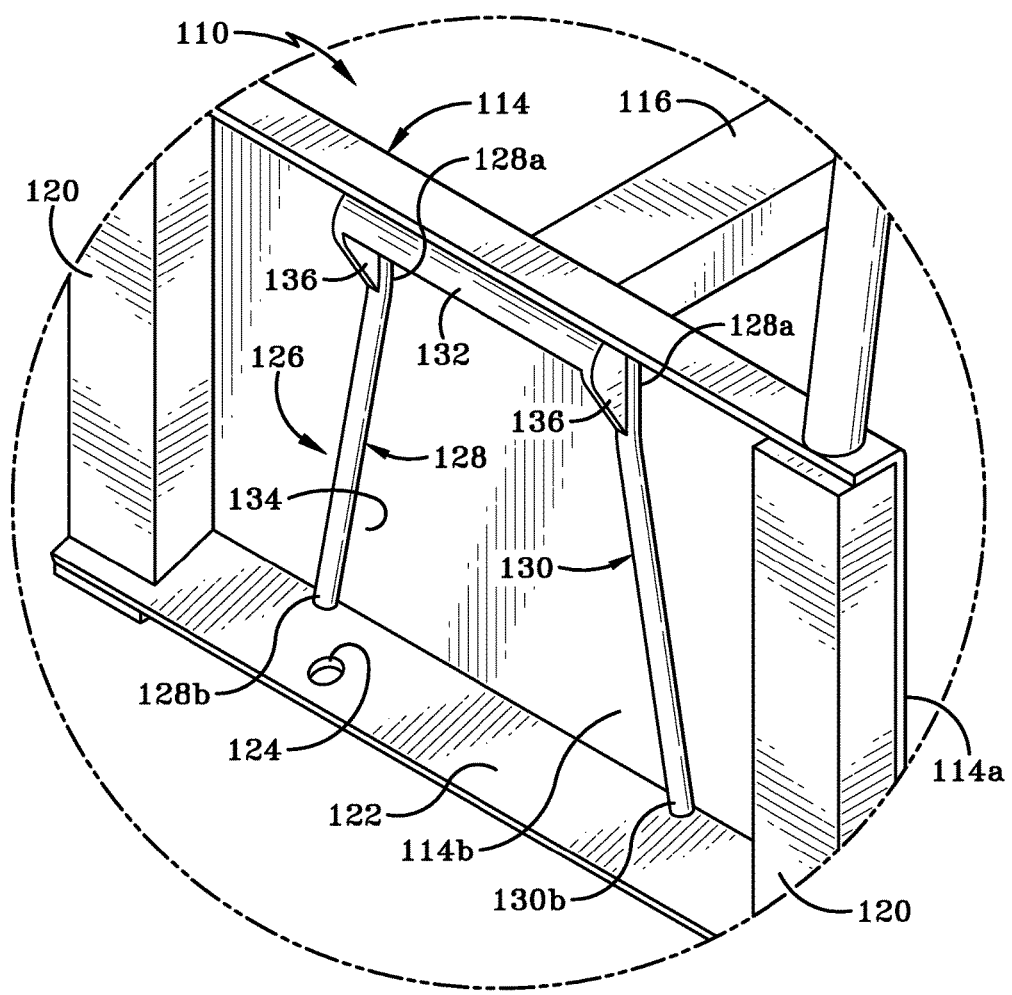
FIG. 9 is an enlarged perspective view of the highlighted region of FIG. 8.

FIG. 8 illustrates one possible attachment, a forklift assembly 110 that may be secured to utility vehicle 10. Forklift assembly 110 includes a back wall 114 having a front surface 114a and a rear surface 114b. A pair of forklift arms 116, 118 extends outwardly and forwardly from front surface 114a of back wall 114. Bracing members 120 are provided on back wall 114 to strengthen the same. A bottom wall 122 extends rearwardly and outwardly from rear surface of back wall 114 and at an angle relative thereto The lowermost edge of bottom wall 114 is spaced a short distance upwardly away from the bottom end of back wall 114. This may be seen in FIG. 11.

An aperture 124 is defined in bottom wall 122 and aperture 124 extends from a top surface of bottom wall 122 through to a bottom surface thereof. Aperture 124 is complementary to the shape and diameter of pin 100 on mounting assembly 52. Aperture 124 is slightly larger in diameter than the diameter of pin 100 so that pin 100 may pass easily therethrough when mounting assembly 52 is engaged with forklift assembly 110. The pin 100 and aperture 124 together comprise a locking mechanism that is used to secure the mounting assembly and connector assembly together. The angle of bottom wall 122 and its spacing upwardly away from the bottom end of back wall 114 help ensure that angled face 102 of pin 100 will not contact the ground surface 28 when pin 100 extends through aperture 124.

Back wall 114 of forklift assembly 110 is provided with a connector assembly 126 that is selectively engaged by the mounting assembly on utility vehicle 10. Connector assembly 126 comprises a complementary truncated triangular-shaped socket configured to receive plate member 54 and locking bar 56 therein. Connector assembly 126 includes a pair of angled side walls 128, 130 provided on rear surface of back wall 114 and extending outwardly away therefrom for a distance. Side wall 128 has a top end 128a and a bottom end 128b. Side wall 130 has a top end 130a and a bottom end 130b. Connector assembly 126 further includes a top wall 132 that extends between top ends 128a and 130a of side walls 128, 130. Side walls 128, 130 may be positioned so that their top ends 128a, 130a are closer to each other than are their bottom ends 128b, 130b. The distance between top ends 128a, 130a approximates the length "L" of locking rod 56 and width "W1" of plate member 54 of mounting assembly 52. The bottom ends 128b, 130b of side walls 128, 130 are positioned further away from each other than are top ends 128a, 130a. The distance between bottom ends 128b, 130b approximates the width "W2" of plate member 152. It will be understood that the distances between top ends 128a, 130a and between bottom ends 128b, 130b is slightly greater than the dimensions of plate member 54 so that plate member 54 will fit between side walls 128, 130. Additionally, the distance between top wall 132 and bottom wall 122 is slightly larger than the height "H1" (FIG. 6) of plate member 54.

As indicated above, each side wall 128, 130 extends for a distance outwardly from rear surface 114b of back wall 114. Side walls 128, 130, top wall 132 and bottom wall 122 bound and define a space 134 that may be at least slightly larger in area than the area of plate member 54. Side walls 128, 130 may be of any cross-sectional shape but are illustrated herein as being generally circular in cross-section. The rounded circumferential surfaces of side walls 128, 130 helps guide plate member 54 of mounting assembly 52 into space 134 when mounting assembly 52 is engaged with connector assembly 126 as will be further described herein.

Figure 11:
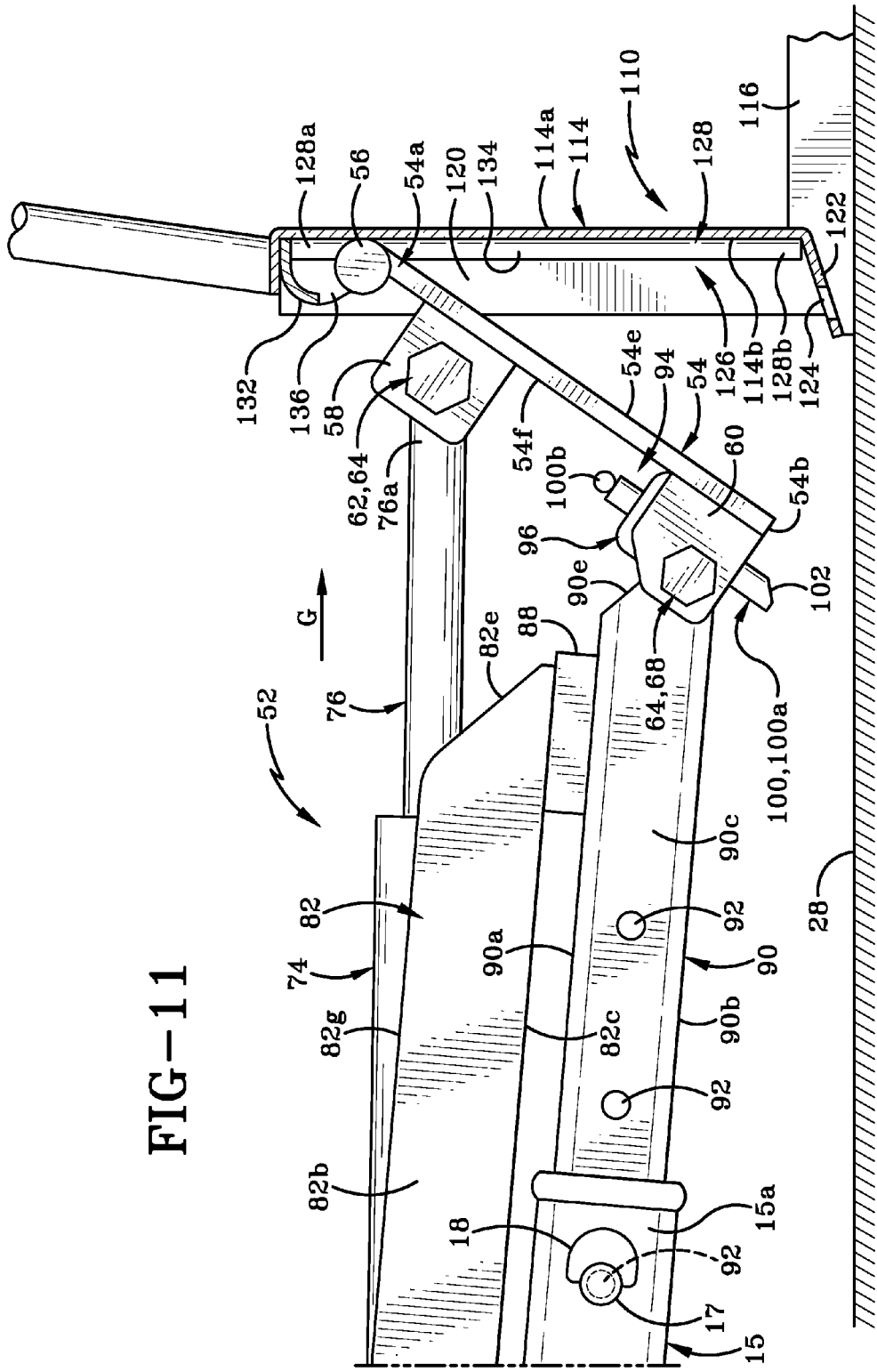
FIG. 11 is an enlarged right side view of the mounting assembly being positioned adjacent the connector assembly on the first attachment.

Top wall 132 extends between top ends 128a, 130a of side walls 128, 130 and extends outwardly and downwardly therefrom. As best seen in FIG. 11, top wall 132 may be a generally J-shaped member or be generally J-shaped in cross-section. Top wall 132 is configured and sized to overhang space 134. Additionally, the radius of curvature of the hooked or curved region of top wall 132 may be substantially complementary to the radius of curvature of locking rod 56. The hooked region of this J-shaped top wall 132 also extends downwardly for a distance below top ends 128a, 130a that is sufficient to prevent locking rod 56 from being disengaged from top wall 132 once mounting assembly 52 is engaged with connector assembly 126.

A buttress 136 extends downwardly from each end of top wall 132 and engages the associated one of the side walls 128, 130. Buttresses 136 and top wall 132 may be formed as a single unit and then welded to side walls 128, 130 or buttresses 136 and top wall 132 may be separate components that are welded or otherwise secured to each other and to side walls 128, 130. Top wall 132 and buttresses 136 extend further outwardly away from rear surface 114b of back wall 114 than do the side walls 128, 130. This can be seen in FIG.

11. Side walls 128, 130, top wall 132 and buttresses 136 limit lateral travel of plate member 54 and locking rod 56 and aid in preventing mounting assembly 52 from disengaging from connector assembly 126.

Mounting assembly 52 may be operatively hydraulically activated via controls 138 or 44 on utility vehicle 10. Mounting assembly 52, itself, may not include any hydraulic lines. Instead, the assembly 52 may be operated via movements imparted to support member 15 by the hydraulic system of vehicle 10. Lower beam 90 of mounting assembly 52 may be engaged with support member 15. Thus, if support member 52 is lowered relative to a top surface of a first end of frame 14, lower beam 90 will also be lowered in unison with support member 52. If support member 52 is retracted, lower beam 90 may also be retracted. Mounting assembly 52 may include three pivots, namely, 68, 80 and 62 (FIG. 2). Pivot 68 connects lower beam 90 to the bottom of plate member 54. Thus, motion in lower beam 90 imparts motion, via pivot 68, to the bottom of plate member 54. Pivot 80 connects lower beam 90/upper beam 82 to cylinder 74. Thus, motion in lower beam 90/upper beam 82 may be imparted to cylinder 74. Piston 76 extending out of cylinder 74 is connected to the upper part of plate member 54 via pivot 62. Thus motion imparted to cylinder 74 in turn may be imparted to the upper part of plate member 54. These pivots 68, 80, 62 make it possible for the operator to pivot/tilt or move forklift assembly 110 as desired, simply by altering the angle and position of plate member 54 relative to the ground surface 28. The angle and position of plate member 54 may be changed by raising, lowering, extending and/or retracting support member 15. Plate member 54 is locked to forklift assembly 110 via the engagement of locking rod 56 with top wall 132 and by pin 100 being locked to bottom wall 122. Thus, any movements made by support member 15 will be transferred to plate member 54 and then, in turn, to back wall 114 of forklift assembly 110, and thereby to forklift assembly 110 itself.

Figure 10:
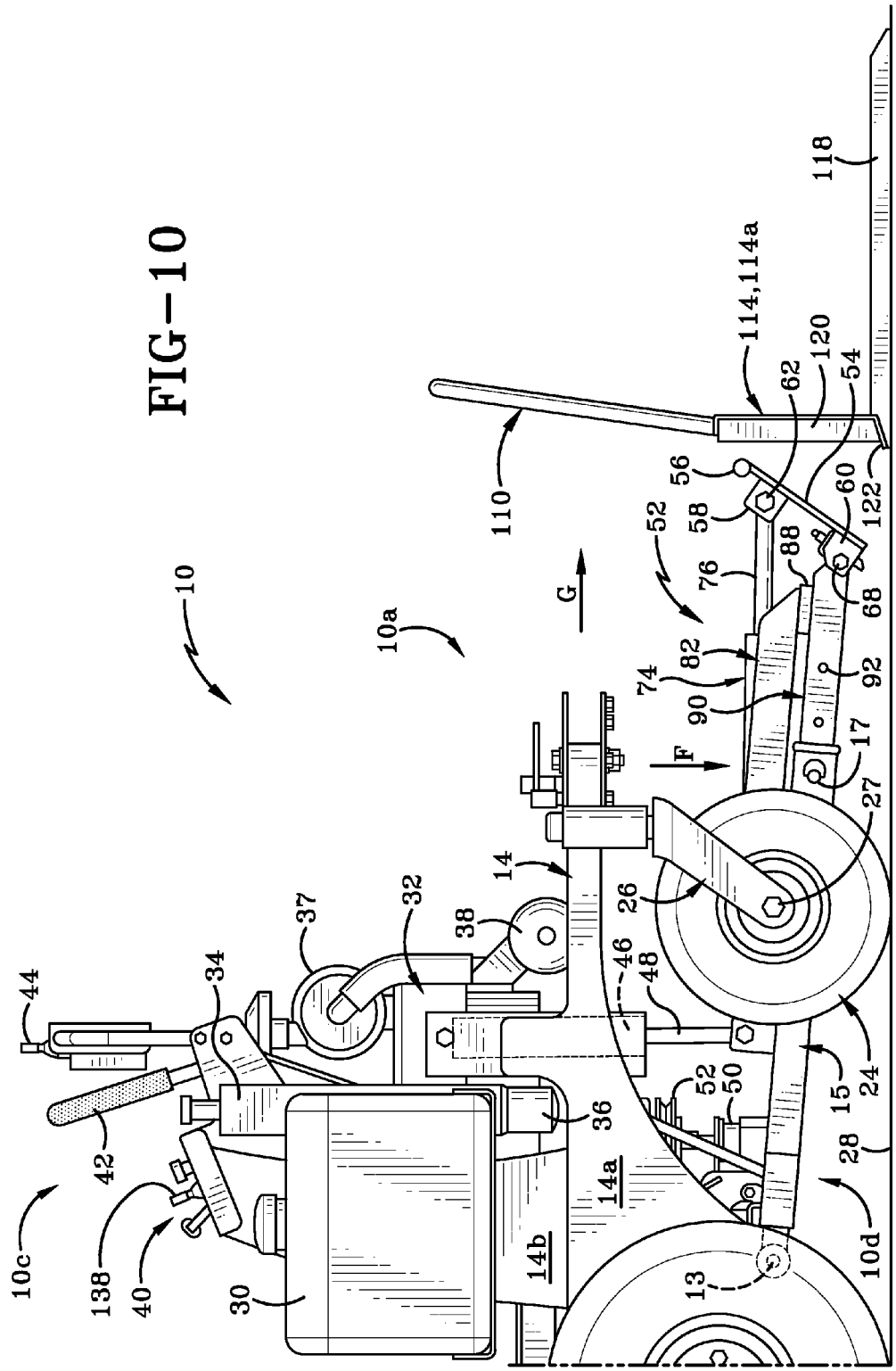
FIG. 10 is a right side view of the utility vehicle with the mounting assembly being moved into a position for engaging the first attachment.

Referring to FIGS. 10-14, mounting assembly 52 is used in the following manner. The attachment, in this instance the forklift assembly 110, is positioned on the ground surface 28. The utility vehicle 10 is positioned proximate forklift assembly 110 so that mounting assembly 52 is adjacent back wall 114 of forklift assembly 110. The hydraulic system of vehicle 10 may be activated by way of controls 138 on control panel 40 or by way of joystick 44. The activation of the hydraulic system causes piston 48 to be extended downwardly in the direction of arrow "F" (FIG. 10). This movement lowers support member 15 and thereby mounting assembly 52 toward ground surface 28. The activation of the hydraulic system also causes piston 76 on mounting assembly 52 to be extended from cylinder 74 in the direction of arrow "G" (FIGS. 10 and 11). Piston 76 is extended until locking rod 56 contacts rear surface 114b of wall 114 on forklift assembly 110 and plate 54 is tilted or angled, such as in FIG. 7. Angling plate 54 in this manner positions plate 54 correctly so that locking rod 56 on upper end of plate 54 is able to be engaged with the connector assembly on the attachment. The angling of plate 54 enables locking rod 56 to be inserted into the gap between the overhung portion of top wall 132 and the back surface 114b, of wall 114 of the attachment, as is described below.

Figure 12:
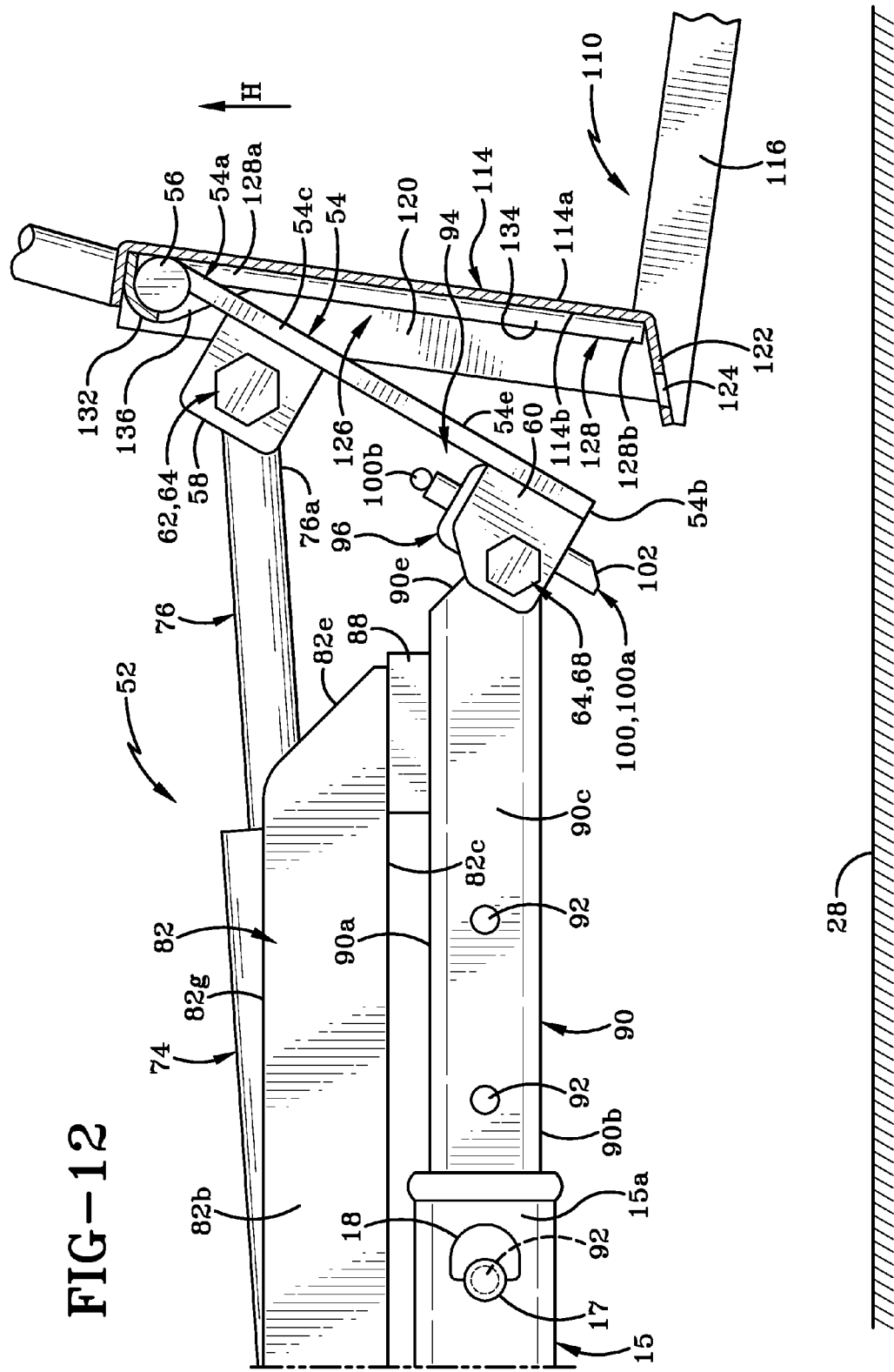
FIG. 12 is an enlarged right side view of the mounting assembly with a locking rod thereof shown positioned in the connector assembly of the first attachment and illustrating the first attachment being raised of the ground surface in order to lock the mounting assembly thereto.
Figure 13:
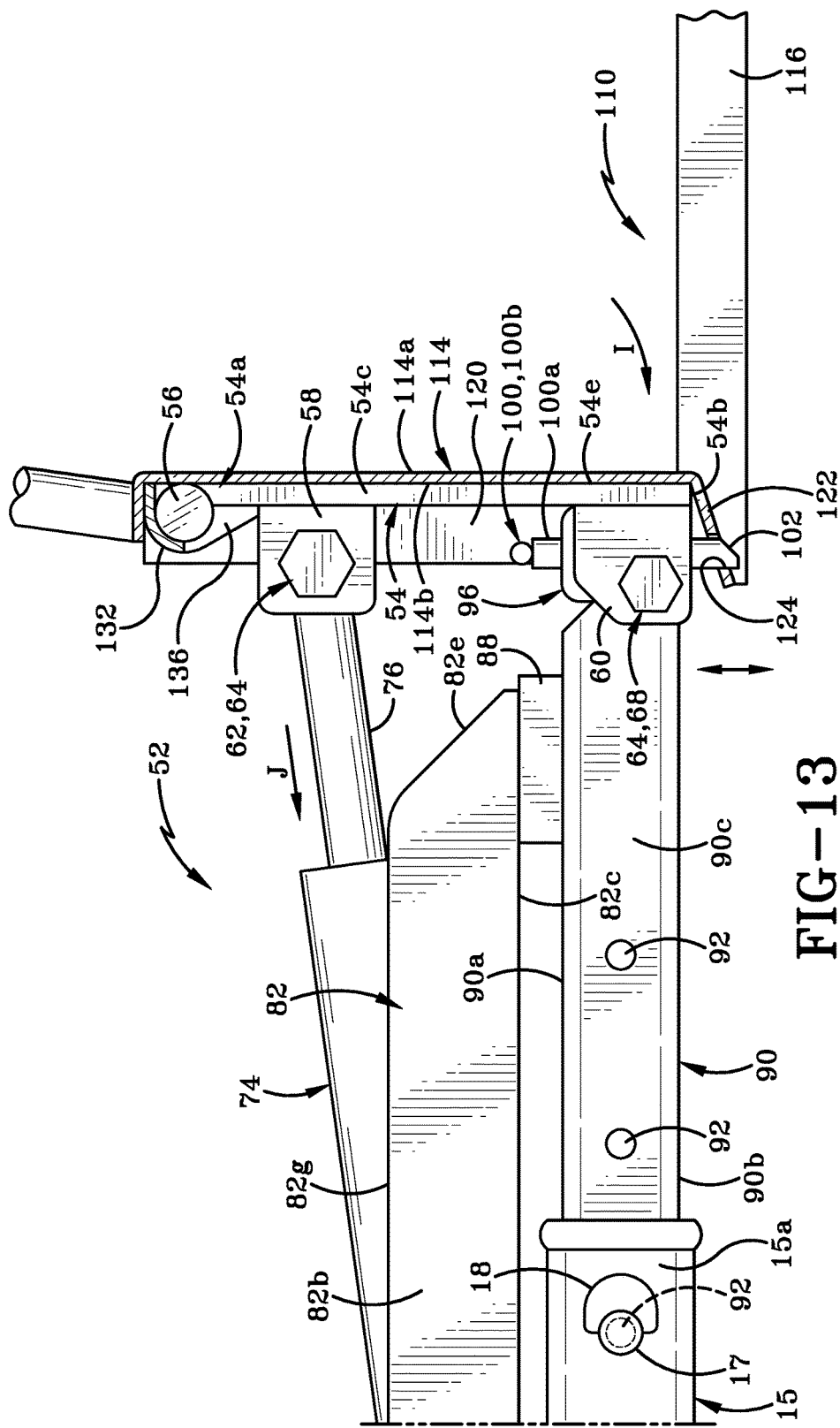
FIG. 13 is an enlarged right side view of the mounting assembly engaged in the connector assembly of the first attachment.

FIG. 12 shows that the hydraulic system is then activated to lift mounting assembly 52 upwardly in the direction of arrow "H". This motion causes locking rod 56 to slide upwardly along rear surface 114b of back wall 114 of forklift assembly 110 until locking rod 56 slides into a gap between the overhung portion of top wall 132 and back surface 114b and into contact with the underside of top wall 132. Locking rod 56 is thus captured between the overhung portion of top wall 132 and back surface 114b. Continued lifting of mounting assembly 52 in the direction of arrow "H" causes forklift assembly 110 to be at least partially raised off ground surface 28. Because of the weight distribution of forklift assembly 110, the assembly 110 tends to swing inwardly toward plate member 54 in the direction of arrow "I" (FIG. 13). The motion brings back wall 114 adjacent plate member 54, thereby bringing angled face 102 of pin 100 of locking assembly 94 into contact with bottom wall 122. The angle of angled face 102 aids in helping pin 100 to slide along bottom wall 122 as assembly 110 swings toward plate member 54. During this sliding motion, pin 100 is pushed upwardly within mounting bracket 96 in the direction of arrow "E" (FIG. 4B), compressing coil spring 106. As soon as angled face 102 reaches aperture 124, spring 106 returns to its original expanded condition and pushes pin 100 and therefore angled face 102 downwardly and further through aperture 124. Pin 100 thus locks mounting assembly 52 to forklift assembly 110 as shown in FIG. 13. The hydraulics are further activated by retracting piston 76 in the direction of arrow "J", thereby returning forklift assembly 110 to its at-rest position on the ground surface 28. At this point, forklift assembly 110 is fixedly secured to utility vehicle 10 and any motion in support member 15 will be transferred to forklift assembly 110. Forklift assembly 110 can therefore be used to lift and move a load. The hydraulic system is activated to raise, lower, or pivot assembly 110 during the lifting and moving a load.

When it is desired to disengage forklift assembly 110 from vehicle 10, mounting assembly 52 is disengaged from the connector assembly 126 on forklift assembly 110. This is accomplished by reversing the steps described above. The pin 100 is moved from the locked position shown in FIG. 4A to the unlocked position shown in FIG. 4B by the operator grasping second leg 100b and pulling upwardly in the direction of arrow "E" (FIG. 4B) and simultaneously rotating pin 100 to cause arm 104 to slide into slot 108. Pin 100 is thus disengaged from bottom wall 122 and retained in an unlocked position. The hydraulics on vehicle 10 are operated to tilt plate member 54 back to the position shown in FIG. 7 and then slide plate member 54 downwardly along rear surface 114b of back wall 114 until locking rod 56 is clear of the overhanging top wall 132. Piston 76 is retracted so that locking rod 56 loses contact with back wall 114 and is separated from forklift assembly 110.

Another attachment, such as hopper 112 (FIG. 14) may then be engaged with mounting assembly 52 in the same manner as described above with reference to forklift assembly 110. Although not illustrated herein in great detail, hopper 112 includes a back wall 140 that is substantially similar in appearance to back wall 114 of forklift assembly 110 in that the connector assembly is provided thereon. Back wall 140 includes a bottom wall 142 defining an aperture through that pin 100 will extend. Back wall 140 also includes angled side walls substantially identical to side walls 128, 130; a top wall and buttresses substantially identical to top wall 132 and buttresses 136. The engagement of mounting assembly 52 with hopper 112 is substantially identical to the manner of engagement of mounting assembly 52 with forklift assembly 110. Likewise, the disengagement of mounting assembly 52 from hopper 52 is substantially identical to the disengagement of mounting assembly 52 from forklift assembly 110.

It will be understood that any attachment that is desired to be engaged on utility vehicle 10 may be provided with a connector assembly having a first configuration on a surface that is substantially identical or similar to the connector assembly 126 illustrated in FIG. 8. In other words, any attachment to be secured to vehicle 10 may include a surface from which side walls 128, 130, a top wall 132, buttresses 136 extend outwardly and also include a sloped bottom wall 122 defining an aperture 124 therein. This configuration of the assembly may be formed on any appropriate wall or surface on the attachment itself during fabrication. Alternatively, a piece of steel plate member similar to back wall 114 could be fabricated to include all of the components of the connector assembly 126 thereon (i.e., side walls, top wall, and bottom wall with aperture as shown in FIG. 8), and then that steel plate member could be welded or otherwise secured to any appropriate region of an attachment. In other words, any attachment could be retrofitted with the connector assembly components and thereby be suitable for engagement with the mounting assembly 52 on vehicle 10.

It will be understood that instead of using support member 15 to adjust the angle and position of the various parts of mounting assembly 52, the hydraulic system, or a pneumatic system or electrical system could be directly linked to mounting assembly 52 to operate same.

It will further be understood that any other shape of the plate member component of the mounting assembly could be utilized with a complementary shape of a connector assembly on the attachment. So, for example, the plate member could be square and the side walls and top wall of the connector assembly could be of the same square shape and size as the plate member.

While the universal mounting assembly 52 and connector assembly 126 have been described as being useful for connecting a range of attachments to a utility vehicle, it will be understood that this type of connection could be used in other applications where it is necessary or desired to attach two components or systems together.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the system including the utility vehicle is by way of example and the invention is not limited to the exact details shown or described.

The invention claimed is:

1. A system comprising:
 a utility vehicle having a vehicle frame upon which a plurality of wheels are mounted in such a way that the vehicle has a turn radius that approximates zero, the plurality of wheels including a forward left wheel spaced apart from a forward right wheel, and a rear left wheel spaced apart from a rear right wheel;
 a support member connected to the vehicle frame via a pivot located forwardly from a rear axle and the pivot located rearwardly from the forward left and right wheels, the support member extending forwardly between the forward left and right wheels and extending forwardly beyond a front end of the vehicle frame and terminating in an outermost end;
 a mounting assembly provided proximate the outermost end of the support member, the mounting assembly having a mounting assembly frame;
 a first actuator engaged with the support member and being operable to move the support member relative to the front end of the frame;
 at least one attachment to be selectively engaged with the utility vehicle; and
 a connector assembly provided on each attachment; wherein a selected one of the at least one attachment is engaged with the utility vehicle by engaging the connector assembly on the selected attachment with the mounting assembly.

2. The system as defined in claim 1, wherein the utility vehicle is a stand-up zero-turn mower.

3. The system as defined in claim 2, wherein the stand-up zero-turn mower includes a platform engaged on the frame and the platform carries an operator thereon in a standing position located rearwardly of the rear left and right wheels; and wherein the selected attachment is secured to the support member in a position forward of the platform.

4. The system as defined in claim 1, wherein the first actuator is a hydraulically-operable actuator.

5. The system as defined in claim 4, wherein the hydraulically-operable first actuator selectively raises or lowers the outermost end of the support member relative to the front end of the vehicle frame.

6. The system as defined in claim 4, wherein the hydraulically-operable first actuator comprises:
 a hydraulic system provided on the utility vehicle; and
 a hydraulic cylinder and piston operatively engaged with the hydraulic system and with the support member.

7. The system as defined in claim 1, wherein the utility vehicle includes a seat operatively engaged with the frame and adapted to receive an operator in a seated position thereon.

8. The system as defined in claim 1, wherein the selected attachment is secured to the support member by the connector assembly and when the first actuator is engaged the selected one of the attachments is selectively raised or lowered or pivoted during use.

9. The system as defined in claim 1, wherein the mounting assembly includes:
 a plate member operatively engaged with the support member; wherein the connector assembly includes a socket that is complementary to the plate member; and wherein the plate member is selectively receivable in the socket.

10. The system as defined in claim 9, further comprising an assembly frame and a second actuator; wherein the second actuator secure a top end of the plate member to the assembly frame; and a bottom end of the plate member is pivotally engaged with the support member and wherein the second hydraulic cylinder and piston are selectively operable to move the top end of the plate member toward or away from the front end of the frame.

11. The system as defined in claim 10, further comprising a locking rod of provided along the top end of the plate member, said locking rod being selectively engaged in a portion of the socket on the selected attachment.

12. The system as defined in claim 11, wherein the locking rod is generally circular in cross-section.

13. The system as defined in claim 12, wherein the locking rod has a front region substantially aligned with a front surface of the plate member and a rear region that extends rearwardly beyond a rear surface of the plate member.

14. The system as defined in claim 12, wherein the socket includes a:
 a first side wall provided on a back surface of a back wall of the selected attachment, said first side wall extending outwardly from the back wall;

a second side wall provided on the back wall and extending outwardly therefrom, wherein the first and second side walls are angled and the first and second side walls are closer to each other proximate a top end of the back wall and are further from each other proximate a bottom end of the back wall;

a top wall extending between the first and second side walls; and wherein the top wall hangs downwardly over a region of the back wall and is positioned and shaped to engage and capture the locking rod of the plate member therein.

15. The system as defined in claim 14, further comprising a locking assembly provided to secure the plate member to the attachment when the locking rod is received in the socket.

16. The system as defined in claim 14, wherein the plate member is of a truncated-triangular shape and the connector assembly is of a complementary truncated-triangular shape.

17. The system as defined in claim 14, wherein the top wall of the connector assembly is a generally J-shaped member; and a curved region of the J-shaped member has a radius of curvature that is substantially the same as a curvature of the locking rod at the top end of the plate member.

18. The system as defined in claim 14, wherein the top wall of the connector assembly extends further outwardly from the back wall of the attachment than does a remaining portion of the connector assembly.

19. The system of claim 10, wherein the first actuator engages the support member rearwardly from the forward left and right wheels and the second actuator is positioned forwardly from the forward left and right wheels.

20. The system of claim 1, wherein the first actuator is located intermediate the rear wheels and the forward wheels.

21. A method of securing an attachment to a utility vehicle comprising:
providing a utility vehicle having a vehicle frame upon which a plurality of wheels are mounted in such a way that the vehicle has a turn radius that approximate zero, the utility vehicle further comprising a support member connected to the vehicle frame via a pivot located forwardly from a rear axle and the pivot located rearwardly from forward left and right wheels, the support member extending forwardly between the forward left and right wheels and extending forwardly beyond a front end of the vehicle frame and terminating in an outermost end;
engaging the support member to a hydraulically operable first actuator provided on the utility vehicle and where that the support member extends towards a front end of the frame;
selecting one of a plurality of attachments for engagement with the utility vehicle; and
engaging a mounting assembly on an outermost end of the support member to a connector assembly provided on the selected one of the plurality of attachments.

22. The method as defined in claim 21, further comprising the step of locking the mounting assembly and connector assembly together.

23. The method as defined in claim 21, wherein the step of engaging the mounting assembly to the connector assembly includes pivoting the plate member on the support member into the complementary socket provided on a back wall of the selected one of the plurality of attachments.

24. The method as defined in claim 23, further comprising the steps of:
angling a top end of the plate member relative to the back wall of the selected one of the plurality of attachments;
inserting a locking rod at the top end of the plate member under an overhanging top wall of the socket;
pivoting the plate member so that a bottom end thereof is moved to a position adjacent a bottom end of the socket; and
engaging a locking mechanism to secure the plate to the selected attachment.

25. The method as defined in claim 21, further including the step of activating the hydraulic first actuator to vertically raise or lower the support member relative to a front end of the vehicle's frame to use the selected one of the plurality of attachments to perform a landscaping task.

26. The method as defined in claim 21, wherein the step of providing a utility vehicle includes providing a stand up zero-turn mower.

27. The method as defined in claim 26, wherein the step of providing the stand up zero-turn mower includes providing a mower including a platform on which an operator stands.

28. A universal mounting system for securing an attachment to a utility vehicle; said mounting system comprising:
a support member extending outwardly beyond a section of the utility vehicle's frame, said support member terminating in an outermost end;
a mounting assembly provided proximate the outermost end of the support member; wherein the mounting assembly includes:
a plate having a top end;
a locking rod at least partially arcuate in cross section provided at the top end of the plate; and
a connector assembly provided on a back wall of the attachment, wherein the connector assembly includes:
a first side wall and a second side wall extending outwardly from the back wall of the attachment; said first and second side walls being spaced apart from each other to a degree sufficient to receive the plate of the mounting assembly therebetween; and a top wall extending between the first and second side walls and projecting for a distance outwardly from the back wall and downwardly beyond a top end of each of the first and second side walls; wherein a gap is defined between the top wall and the back wall of the attachment; and
wherein the locking rod at the top end of the plate is captured in the gap when the plate is engaged between the first and second side walls.

29. The mounting system as defined in claim 28, wherein the plate has to be angled relative to the back wall when sliding the locking rod into the gap.

* * * * *